March 19, 1935.   G. VAN GEONS, JR   1,995,083
AIRCRAFT
Filed June 20, 1934   4 Sheets-Sheet 1

Inventor
G. Van Geons, Jr.
By Clarence A. O'Brien
Attorney

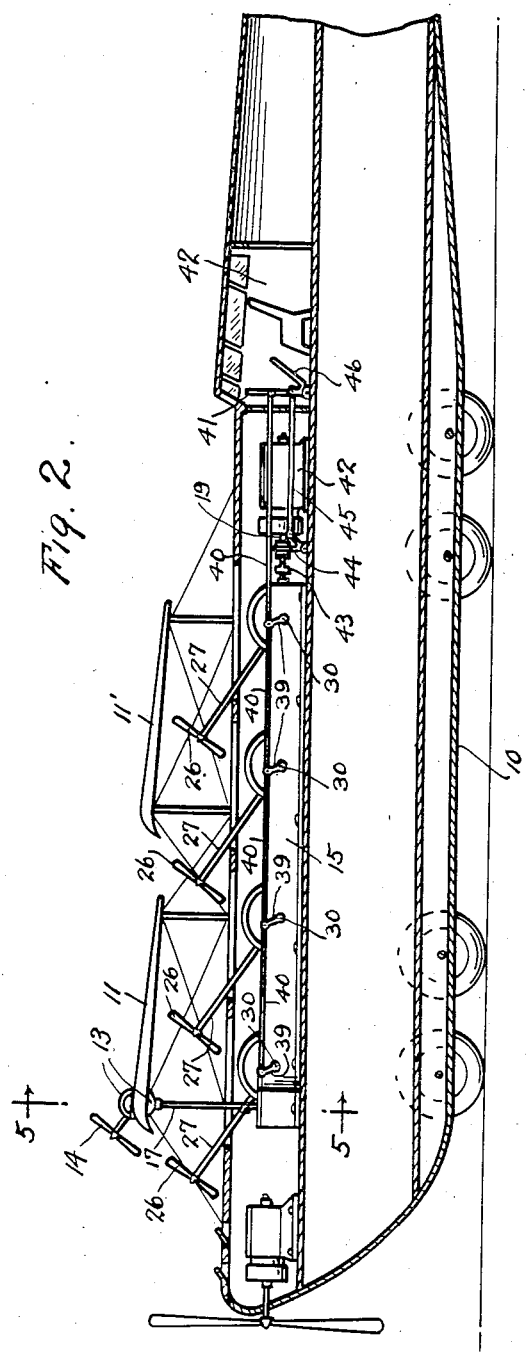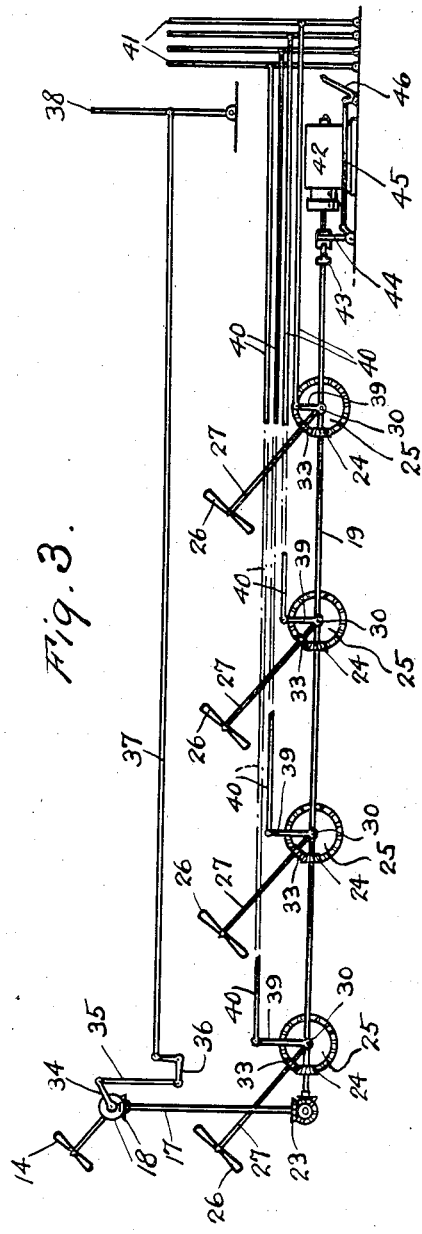

March 19, 1935. G. VAN GEONS, JR 1,995,083
AIRCRAFT
Filed June 20, 1934 4 Sheets-Sheet 3
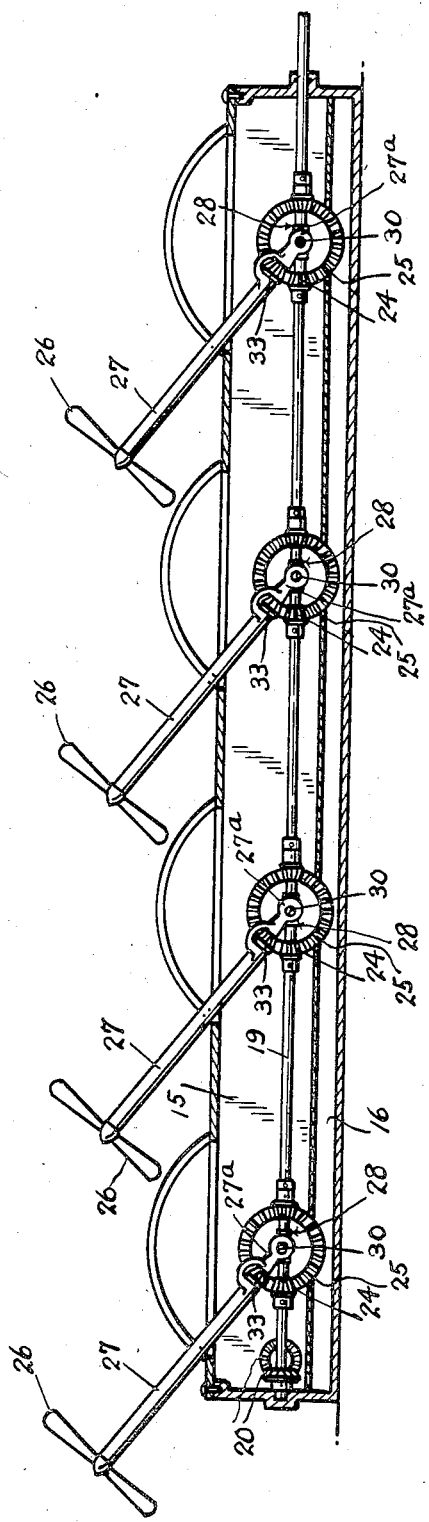
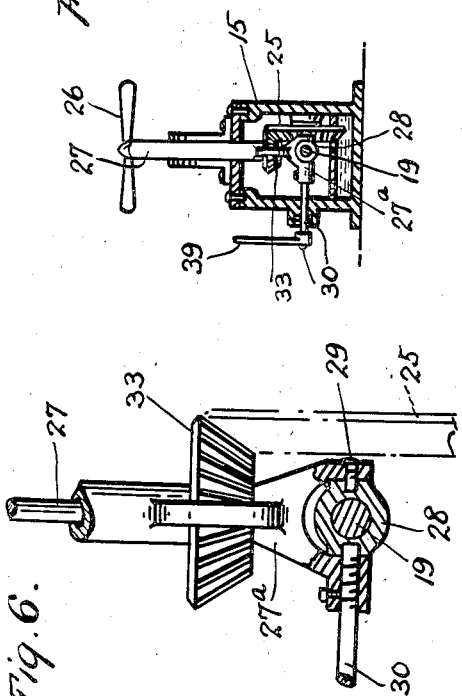
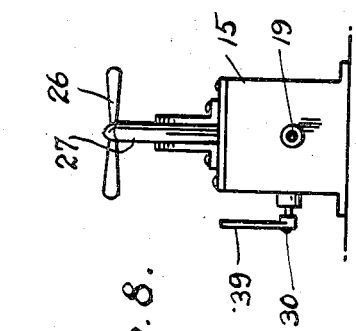
Inventor
G. Van Geons, Jr.
By Clarence A. O'Brien
Attorney March 19, 1935.  G. VAN GEONS, JR  1,995,083
AIRCRAFT
Filed June 20, 1934    4 Sheets-Sheet 4
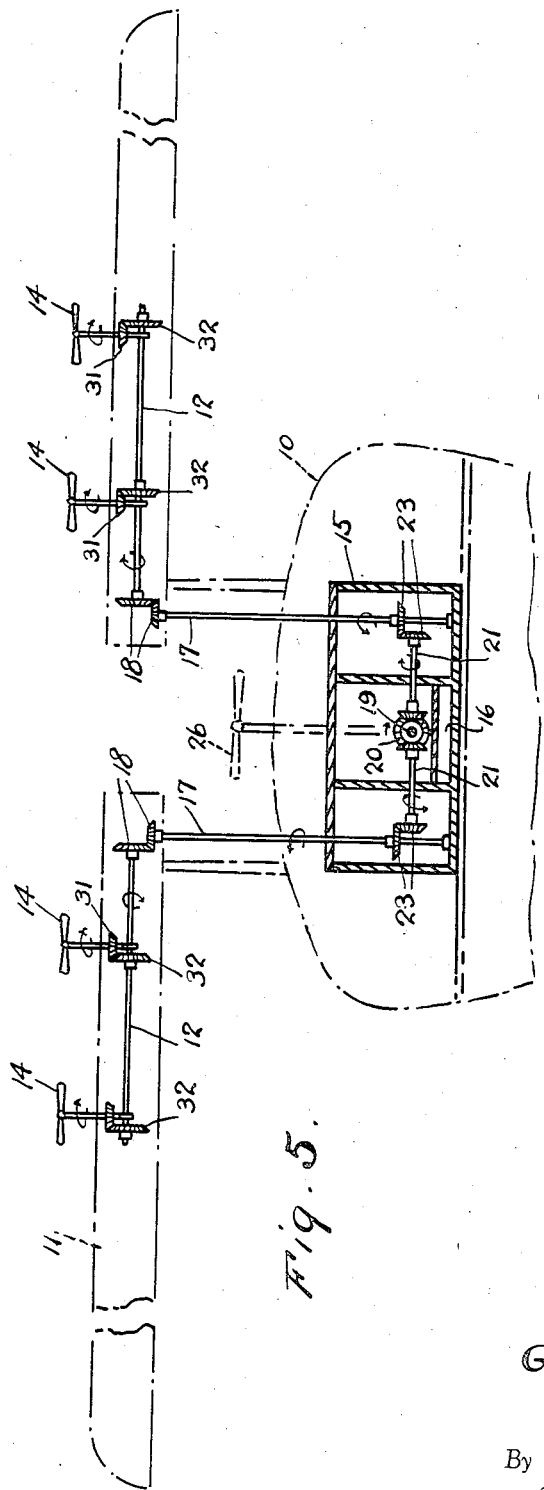
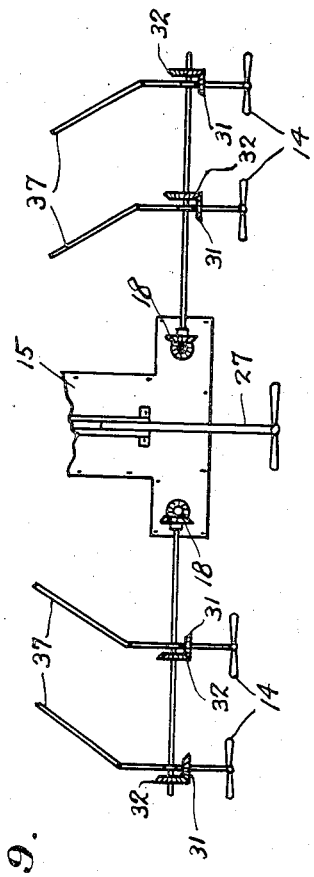
Inventor
G. Van Geons, Jr.
By Clarence A. O'Brien
Attorney Patented Mar. 19, 1935

1,995,083

UNITED STATES PATENT OFFICE 1,995,083

AIRCRAFT

George Van Geons, Jr., Danbury, Conn.

Application June 20, 1934, Serial No. 731,527

2 Claims. (Cl. 244—25)

This invention relates to aircraft of the heavier-than-air type and the principal objects of the invention are generally to improve upon the construction of the existing forms of similar aircraft, to provide such an aircraft with greater wing spread whereby provision will thus be made for greater speed and safety, and further to provide such an aircraft with an improved propeller assembly which can be adjusted to enable the aircraft to take off or land within a considerably small area.

The invention, together with its objects and advantages will be best understood from a study of the following description taken in connection with the accompanying drawings wherein:

Figure 2 is a fragmentary enlarged sectional view taken through the body of the aircraft.

Figure 3 is a diagrammatic view of the propeller assembly.

Figure 4 is a view partly in section and partly in elevation illustrating certain features of the propeller assembly to be hereinafter more fully referred to.

Figure 5 is a sectional view taken substantially on the line 5—5 of Figure 2.

Figure 6 is a detail view illustrating the driving means for one of the propellers of the assembly, and the means for varying the angle of the shaft of the propeller relative to the vertical.

Figure 7 is a transverse sectional view of the structure shown in Figure 4.

Figure 8 is an end elevational view of the structure show in Figure 4.

Figure 9 is a diagrammatic view of the propeller assembly associated with the sustaining planes or wings of the aircraft.

Figure 1:
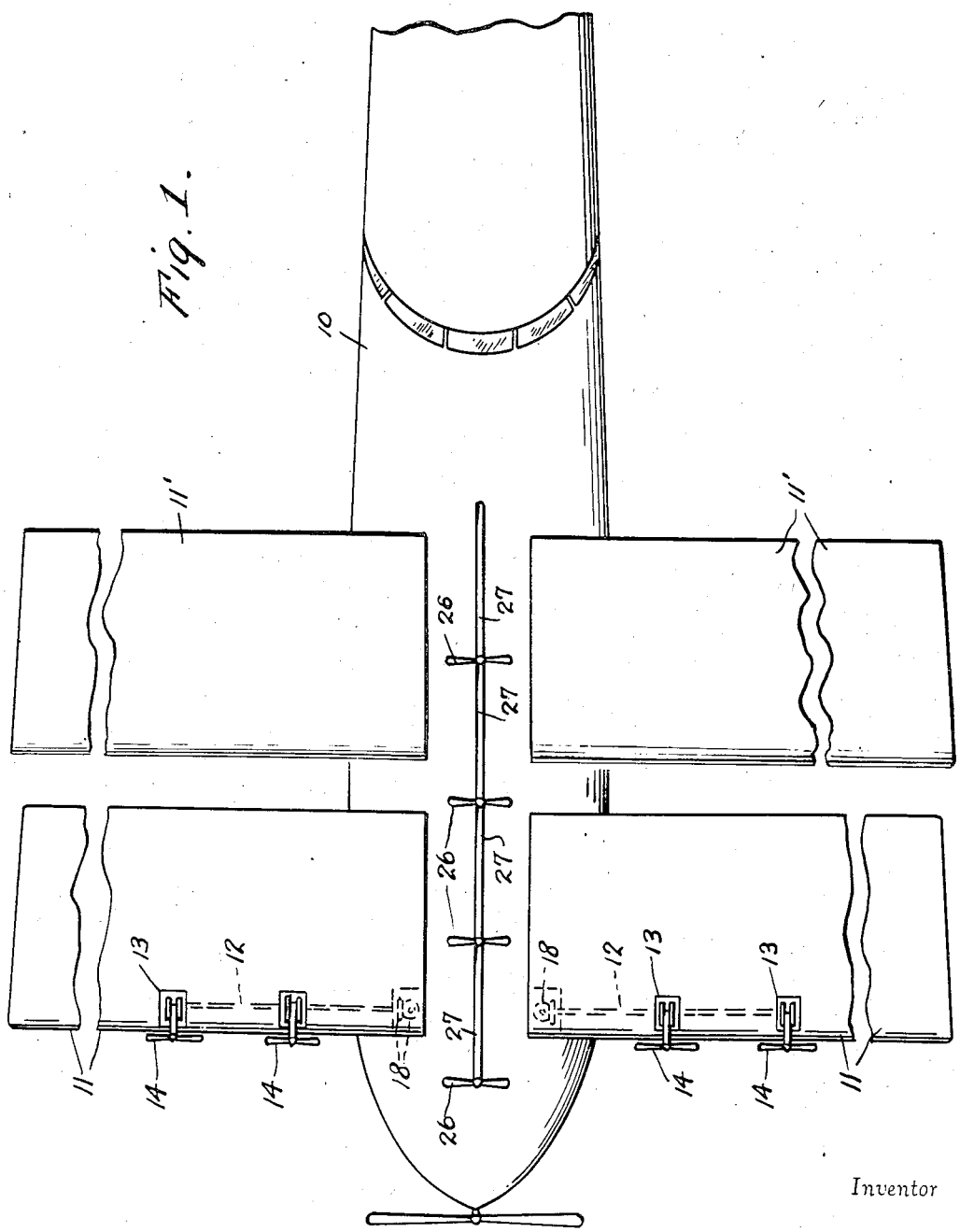
Figure 1 is a fragmentary plan view of an aircraft embodying the features of the present invention.

Referring by numerals to the drawings, 10 indicates an elongated structure that forms the body or fuselage of the aircraft, the body being of any suitable shape in cross section and elevation and constructed of any suitable material in any suitable manner.

The aircraft among other parts also includes suitably mounted laterally extending sustaining planes or wings 11 disposed adjacent the forward end of the fuselage and similar wings 11' disposed rearwardly of the wings or planes 11.

Suitably journaled in the wings 11 adjacent the forward ends of the wings and at the inner ends of the wings are shafts 12 having driving engagement with propeller shafts mounted to swing in vertical arcs and operating through suitable openings 13 provided in the top portion of the wings 11. At their outer or free ends, the aforementioned propeller shafts are provided with propellers 14. In the present instance, each wing 11 is equipped with two propellers 14 as clearly shown in Figure 1.

Mounted within the body 10 and extending longitudinally thereof at the forward end of the body is a casing 15 provided in its bottom with an oil chamber 16 as shown in Figures 5 and 4. Vertical shafts 17 have lower portions journaled in the forward ends of the casing 15 and at their upper ends the shafts 17 are connected with the shafts 12 by suitable beveled gearing 18. Journaled in the casing 15 and extending longitudinally thereof is a drive shaft 19 which at its forward end is connected through the medium of beveled gearing 20 with oppositely extending lateral shafts 21 that are connected through the medium of suitable bevel gearing 22 with the shaft 17. Thus it will be seen that the propellers 14 are driven through the medium of the shafting and gearing just described from the driving shaft 19.

Mounted on the shaft 19 are pairs of relatively spaced beveled gears 24, in the present instance there being four pairs of such gears 24. Each pair of gears 24 is in mesh with a bevel gear 25 mounted on one end of a stub shaft suitably journaled in a bearing provided on the side wall of the casing 15 as suggested in Figure 7.

Driven from the shaft 19 through each set of gearing 24 and 25 is a propeller 26.

Each of the propellers 14 and 26 has the shaft thereof operating in a tubular housing 27 that at one end is provided with an integral fork 27a. The fork 27a is pivoted to a sleeve 28 through the medium of a pin 29 and a rod 30. Further, the shaft for each propeller 14 adjacent the yoke-equipped end of its housing is provided with a bevel gear 31 in mesh with a bevel gear 32 on the shaft 12 while the propeller shaft for each propeller 26 is similarly provided with a bevel gear 33 that is in mesh with one of the aforementioned bevel gears 25 as shown in Figures 6 and 7. It will thus be seen that the propellers 14 are driven through the medium of the gearing 31 and 32 from the shafts 12 while the propellers 26 are driven through the medium of the gearing 24 and 25 and 33 from the shaft 19.

It will also be apparent that the collars 28 associated with the yokes of the tubular housing 27 for the shafts of propellers 14 are disposed on the shaft 12 while the collars 28 associated with the yokes or forks of the housing 27 for the shafts of the propellers 26 are arranged on the shaft 19.

For swinging the shafts or axes of the propellers 14 to the desired angle relative to the vertical, the rods 30 associated therewith are, as clearly suggested in Figure 3, equipped with crank arms 34 connected by links 35 with one end of suitably mounted bell cranks 36. The bell cranks 36 are in turn connected by operating rods 37 with control levers 38, there being one lever 38 for each propeller 14.

Also, the rod 30 associated with each propeller 26 is provided with a crank arm 39 and as suggested in Figure 3, each crank arm 39 is connected through the medium of a link 40 of suitable length with a control lever 41. The levers 38 are suitably mounted in the pilot or control room 42 suitably provided in the body of the aircraft. Obviously by manipulating the proper lever 41, the desired propeller 26 may be manipulated to vary the angular position of the axis or shaft of said propeller relative to the perpendicular.

For driving the main shaft 19, there is suitably provided a prime mover or motor 42 the shaft of which is operatively connected with the shaft 19 through the medium of a suitable clutch 43. For operating the clutch 43 to engage or interrupt the drive connection between the motor 42 and the shaft 19, there is provided a suitably and pivotally mounted fork 44 that is connected through the medium of a link 45 with a control lever 46 arranged within the control room 42.

From the foregoing it will be apparent that by providing two sets of wings or planes 11 and 11', a greater wing spread is provided to give greater speed and safety, while the provision of the tilting propellers 14 and 26 enable the pilot to land or take off within an area considerably smaller than is generally required.

What is claimed is:

1. In an aircraft, a body, provided in the top thereof with a plurality of slots, a casing mounted internally of the body and provided in the top thereof with a plurality of slots, a shaft journaled in the casing, a plurality of collars arranged on the shaft in spaced relation, a propeller shaft housing pivotally connected at one end with each collar, and operating through the slots in the housing and top of the body of the aeroplane, a propeller shaft journaled in each housing, a propeller on the outer end of said shaft, a driving connection between each propeller shaft and the first named shaft, and manual means connected with each propeller shaft housing for rotating the same about its pivot.

2. In an aircraft, a body, provided in the top thereof with a plurality of slots, a casing mounted internally of the body and provided in the top thereof with a plurality of slots, a shaft journaled in the casing, a plurality of collars arranged on the shaft in spaced relation, a propeller shaft housing pivotally connected at one end with each collar, and operating through the slots in the housing and top of the body of the aeroplane, a propeller shaft journaled in each housing, a propeller on the outer end of said shaft, a driving connection between each propeller shaft and the first named shaft, manual means connected with each propeller shaft housing for rotating the same about its pivot, sustaining planes projecting laterally from opposite sides of the body, shafts journaled in the sustaining planes, collars on the last named shafts, propeller shaft housings pivoted at one end to the last named collars, propeller shafts journaled in the last named housings, propellers on one end of the last named propeller shafts, driving means between the last named propeller shafts and the shafts journaled in said sustaining planes, manual means connected with each of the last named propeller shaft housings for rotating the latter about their respective pivots, a prime mover, and a clutch controlled driving connection between the prime mover and the shaft in said housing, and manual means for controlling said clutch.

GEORGE VAN GEONS, Jr.